O. OJALA.
AUTOMOBILE HEADLIGHT TURNING DEVICE.
APPLICATION FILED OCT. 20, 1914.
1,150,381. Patented Aug. 17, 1915.
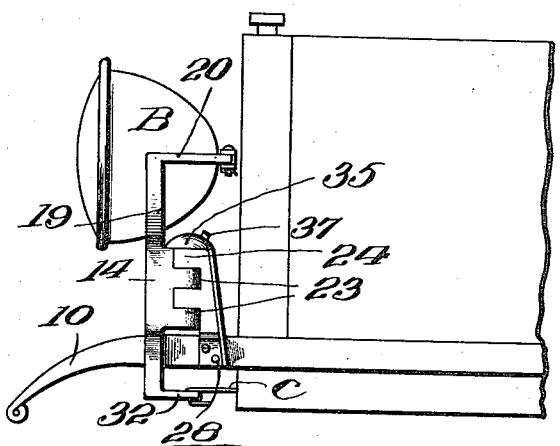
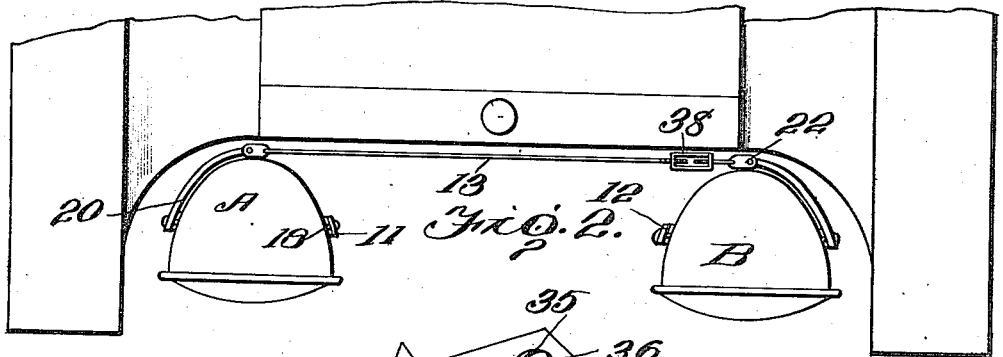
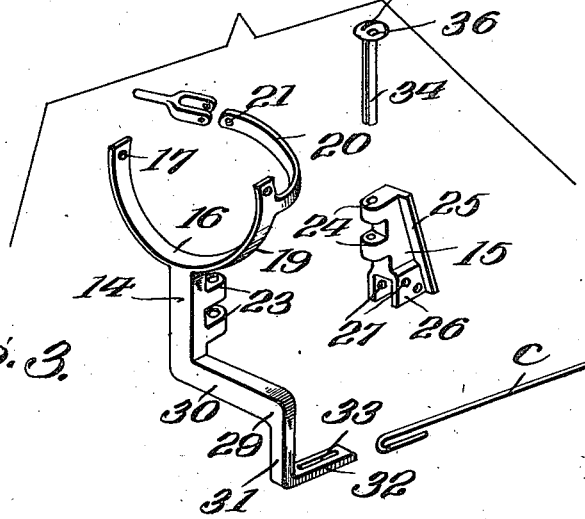
Witnesses
Inventor
O. Ojala
By
Attorney

UNITED STATES PATENT OFFICE.

OTTO OJALA, OF VIRGINIA, MINNESOTA.

AUTOMOBILE HEADLIGHT-TURNING DEVICE.

1,150,381.  Specification of Letters Patent.  Patented Aug. 17, 1915.

Application filed October 20, 1914. Serial No. 867,619.

*To all whom it may concern:*

Be it known that I, OTTO OJALA, a citizen of the United States, residing at Virginia, in the county of St. Louis and State of Minnesota, have invented certain new and useful Improvements in Automobile Headlight-Turning Devices, of which the following is a specification.

This invention relates to new and useful improvements in automobile headlights of the type which are adapted to be steered by the steering mechanism of the vehicle in accordance with the deflections of the front wheel so that the light from the lamps will be projected along the path or direction followed by the vehicle.

The principal object of my invention is to provide a novel, simple and efficient form of supporting bracket for each of the head lamps.

A further object is to form an extension on the spindle of one of the lamp brackets and to so shape the extension that it may be readily attached by a connecting rod or link to the transverse steering rod of any standard form of automobile.

Another object of my invention is to form the lamp brackets with such regard to arrangement of the parts that they may be employed in connection with any standard form of automobile and head lamp.

The above recited and other incidental objects of a similar nature which will be hereinafter more specifically treated are accomplished by such means as are illustrated in the accompanying drawing described in the following specification and then more particularly pointed out in the claims which are appended hereto and form a part of this application.

With reference to the drawings, wherein I have illustrated the preferred embodiment of this invention as it is reduced to practice, and throughout the several views of which similar reference numerals designate corresponding parts—

Figure 1 is a side elevation of the forward portion of an automobile showing a lamp supported on the side member of the chassis by my improved form of bracket. Fig. 2 is a top plan view of the forward portion of the automobile disclosing the lamps properly supported by the brackets and connected by a steering rod which serves to communicate the motion imparted to one lamp from the automobile steering mechanism to the other lamp. Fig. 3 is a detail perspective view of one of the brackets with the parts thereof in disassembled relation indicating the manner in which they are assembled to form an operative device.

In the embodiment of my invention shown in the accompanying drawings the lamps A and B are supported for oscillation at the forward ends of the chassis side members 10 by brackets 11 and 12 which latter members are connected by a rod 13.

The brackets are substantially similar in construction and reference will, therefore, be had to Fig. 3 in which one of the brackets is illustrated in detail. As will be seen each bracket consists in two parts, one of which, indicated by the numeral 14, constitutes the body, the other of which, designated by the numeral 15, serves as an attaching plate or block for securing the body member to the chassis. The body member 14 is formed from a single metallic casting and includes a spindle 15 and a fork or yoke 16, the upper terminals of which are apertured, as at 17 to receive the laterally extending trunnions 18 such as ordinarily provided for the standard form of headlight whether it be of the electric or gas type. The outer arm 19 of the member 16 is provided with a rearwardly and inwardly curved arm 20 the free terminal of which is apertured as at 21 to receive the pivot pin or bolt 22 by which the arm and connecting rod 13 are connected. From the rear face of the spindle 16 extends a plurality of vertically spaced hinged ears or lugs 23. These members 23 are adapted to mate with the hinge lugs or ears 24 which extend from the forward face of the attaching block 15. This attaching block 15 is provided at its rear edge with a vertically and laterally extending web plate 25, the function of which is to impart the desired strength to the block and to the depending plates 26. These members 26 are spaced from each other a sufficient distance to permit them to be applied to opposite faces of the chassis side member 10. Apertures 27, formed in the members 26, permit the insertion of bolts or similar fastening devices 28 through the member 10 for holding the block in position thereon.

The bracket, illustrated in detail in Fig. 3, is provided with an arm 29 which is formed integrally with the spindle 15. This arm is first directed horizontally and laterally from the spindle 15, as indicated at 30, and is then bent downwardly at right angles, as indicated at 31. The lower terminal of the depending portion 31 is directed rearwardly and at right angles, as indicated at 32, and is apertured at 33 so that it may be pivotally connected by a rod C to the transverse rod, such as is ordinarily provided in automobile steering mechanism. If deemed expedient, the rod A may be detached from the transverse rod of the steering mechanism during the day time and secured to a rack on the chassis or body of the automobile for holding the lamps in stationary position.

The bolt or axle 34 by which the members 23 and 24 are connected is provided with a longitudinally extending facial groove which serves to supply lubricant to the members 23 and 24. In this connection, it should be noted that the head 35 of the bolt is relatively large and is provided with an oil duct 36 through which oil passes from the oil cup 37 into the groove.

It is now to be explained that the bracket 11 need not be provided with the extension or arm 29, since the turning movement of the lamp B will be communicated to the bracket 11 and, consequently, the lamp A by the connecting rod 13. A turn-buckle, indicated at 37, may be interposed in the member 13 so that the effective length of this member may be varied to regulate the distance at which the rays of light from the two lamps will intersect in front of the machine.

From the foregoing description it will now be apparent that I have provided a relatively simple form of bracket which may be easily and quickly attached to any standard form of automobile for revolubly supporting the head-lamps thereof.

In reduction to practice, I have found that the form of my invention, illustrated in the drawings and referred to in the above description as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus described the invention, what is claimed as new is:—

1. In a device of the character described, a pair of lamp brackets, attaching blocks for securing the brackets to the frame members of an automobile chassis, an arm formed on one of the brackets at the lower terminal thereof, said arm being adapted to be connected to the steering mechanism of an automobile, arms formed on the upper terminal of each bracket, and a longitudinally adjustable rod connecting the last-mentioned elements whereby the movement imparted to one bracket will be communicated to the other, and whereby the angular relation of the two brackets to each other may be adjusted.

2. In a headlight steering mechanism for automobiles, a pair of attaching blocks secured to the side members of an automobile chassis, hinge lugs extending laterally from the said blocks, a pair of lamp brackets, each of said brackets including a spindle having a fork formed on the upper terminal thereof, a plurality of hinge lugs formed on the spindles and adapted to coact with said first mentioned lugs, and an arcuate arm formed on the outermost arm of each of the fork members, a bolt connecting the hinge lugs of the spindles and the lug members, an angular arm formed on one of the spindles, said last-mentioned arm being adapted to be attached to the steering mechanism of an automobile, and a longitudinally adjustable rod connecting the arcuate arms whereby the movement imparted to one bracket will be communicated to the other bracket.

In testimony whereof I affix my signature in presence of two witnesses.

OTTO OJALA. [L. S.]

Witnesses:
 JOHN KETOLA,
 ARTHUR KREUS.